(12) United States Patent
Huang

(10) Patent No.: US 7,703,913 B2
(45) Date of Patent: Apr. 27, 2010

(54) EYEGLASSES

(75) Inventor: Shu-Han Huang, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 12/270,911

(22) Filed: Nov. 14, 2008

(65) Prior Publication Data
US 2009/0323017 A1 Dec. 31, 2009

(30) Foreign Application Priority Data
Jun. 26, 2008 (TW) .............................. 97123834 A

(51) Int. Cl.
G02C 1/02 (2006.01)
(52) U.S. Cl. .................. 351/110; 351/116; 351/153
(58) Field of Classification Search .................. 351/110, 351/116, 153, 111, 41, 158; 16/228
See application file for complete search history.

(56) References Cited

U.S. PATENT DOCUMENTS

| | | |
|---|---|---|
| 3,574,452 A | 4/1971 | Hanson |
| 4,699,479 A | 10/1987 | Metcalfe |
| 4,832,478 A | 5/1989 | Salce |
| 4,978,209 A | 12/1990 | Ohba |
| 5,069,541 A | 12/1991 | Holmes |
| 5,173,722 A | 12/1992 | Calamand |
| 5,471,258 A | 11/1995 | Hsieh |
| 5,594,511 A | 1/1997 | Lin |
| 5,898,471 A | 4/1999 | Simioni |
| 5,936,701 A | 8/1999 | Sartor |
| 5,980,038 A | 11/1999 | Chen |
| 5,980,039 A * | 11/1999 | Schmid et al. .............. 351/153 |
| 6,007,196 A | 12/1999 | Saba |
| 6,238,048 B1 | 5/2001 | Fukuoka |
| RE37,523 E | 1/2002 | Bondet |
| 6,575,570 B2 | 6/2003 | Mauri |
| 6,834,952 B2 | 12/2004 | Polovin |
| 6,994,434 B2 * | 2/2006 | Blanchette et al. .......... 351/110 |
| 7,003,811 B2 | 2/2006 | Canavan |
| 7,237,892 B2 | 7/2007 | Crci |

* cited by examiner

Primary Examiner—Hung X Dang
(74) Attorney, Agent, or Firm—Rosenberg, Klein & Lee

(57) ABSTRACT

The present invention is related to a pair of eyeglasses, comprising at least a lens, at least a pair of temples, at least a pair of engaging elements, and at least a connecting element. The lens includes at least a pair of engaging elements disposed on the left and right opposite sides of the lens, and the engaging elements include a C type engaging portion. The pair of temples include at least a connecting element disposed at one end of the temples to be pivotally connected to the engaging elements of the lens, and the connecting element includes at least a connecting pillar and is at least partially suspended. Wherein when the connecting element and the engaging elements are pivotally connected to each other, the connecting pillar of the connecting element is disposed in the C type engaging portion for the pivotal connection of the lens and the temples to be completed in a simple and fast way.

20 Claims, 10 Drawing Sheets

EYEGLASSES

BACKGROUND OF THE INVENTION

1. Technical Field

The present invention is related to a pair of eyeglasses, and more particularly, to a pair of eyeglasses in which engaging element and connecting element are used for completing the pivotal connection between lens and temple.

2. Description of Prior Art

From eyeglasses for myopia, presbyopia, and vision correction emphasizing practicality, eyewear for industry use, sunglasses, and windproof eyeglasses emphasizing functionality, to stylized eyeglasses emphasizing aesthetic appearance and fashion as mainstream, eyeglasses almost become an indispensable device in the daily life of modern people. And the most common style of eyeglass in the current market is a pair of eyeglasses with an eyeglass frame to support a pair of lens (framed eyeglasses) or with only a pair of lens (frameless eyeglasses), wherein the temples are pivotally connected to the left and right opposite sides of the frame (lens) with screw. However, when eyeglasses pivotally connected in such way are used for a long time, the screw may become loose or worn and thus lead to loosening of temples. At this moment a supplementary tool (screw driver) is needed to back the screw out or drive the screw in for further reparation or taking-apart. However, not only does such process of taking-apart take much time and efforts, but it is also easy for screw to be indirectly damaged and thus become unusable when being backed out or driven in. And if there is no supplementary tool at hand, then the replacement cannot be done at all, which causes much inconvenience.

In addition, when this type of eyeglass is produced by ordinary eyeglass manufacturers, it is often needed to complete the pivotal connection of eyeglass frame (lens) and temples by handwork. Therefore in addition to the cost of raw materials, there will also be extra cost of manpower for performing this handwork, and thus the production cost cannot be decreased and the competitiveness in the industry is lost.

BRIEF SUMMARY OF THE INVENTION

In order to solve above-mentioned problems, one primary objective of the present invention is to provide a pair of eyeglasses, in which engaging element and connecting element are used for completing the pivotal connection of lens and temples and which reduces complexity in assembling.

Another primary objective of the present invention is to provide a pair of eyeglasses which is assembled with a simpler method for saving time and manpower cost spent in completing pivotal connection and disassembly.

Still another primary objective of the present invention is to provide a pair of eyeglasses, the engaging element and connecting element of which can be disposed respectively on lens and on temples and which provides better replaceability.

Yet another primary objective of the present invention is to provide a pair of eyeglasses, the engaging element and connecting element of which can be disposed respectively on lens and on temples and which provides better effect of pivotal connection.

According to above objectives, the present invention provides a pair of eyeglasses in which pivotal connection between lens and temples are completed by using engaging element and connecting element. The pair of eyeglasses comprises at least a lens, at least a pair of temples, at least a pair of engaging element, and at least a connecting element. The lens includes at least a pair of engaging elements disposed on the left and right opposite sides of the lens, and the engaging elements include a C type engaging portion. The pair of temples include at least a connecting element disposed at one end of the temples to be pivotally connected to the engaging elements of the lens, and the connecting element includes at least a connecting pillar and is at least partially suspended. Wherein when the connecting element and the engaging elements are pivotally connected to each other, the connecting pillar of the connecting element is disposed in the C type engaging portion for the pivotal connection of the lens and the temples to be completed in a simple and fast way.

Since the assembly method of the pair of eyeglasses of the present invention in which engaging element and connecting element are used to complete pivotal connection of lens and temples is simpler, the time and manpower cost spent in completing pivotal connection and disassembly can be greatly reduced. And also because the pair of eyeglasses is assembled by several components, if one of the components cracks or is worn out and leads to damage, only the damaged component needs to be replaced individually and no unnecessary waste will be generated.

BRIEF DESCRIPTION OF THE DRAWINGS

The invention as well as a preferred mode of use, further objectives and advantages thereof will best be understood by reference to the following detailed description of illustrative embodiments when read in conjunction with the accompanying drawings, wherein.

DESCRIPTION OF THE PREFERRED EMBODIMENT

Since the present invention discloses a pair of eyeglasses and some detailed parts of process for manufacturing or processing eyeglasses are accomplished by applying prior art, therefore these parts will not be completely depicted in the description below. And the drawings referred to in the following are not made according to the actual related sizes and the function of these drawings is only for illustrating characteristics related to the present invention.

Figure 1A:
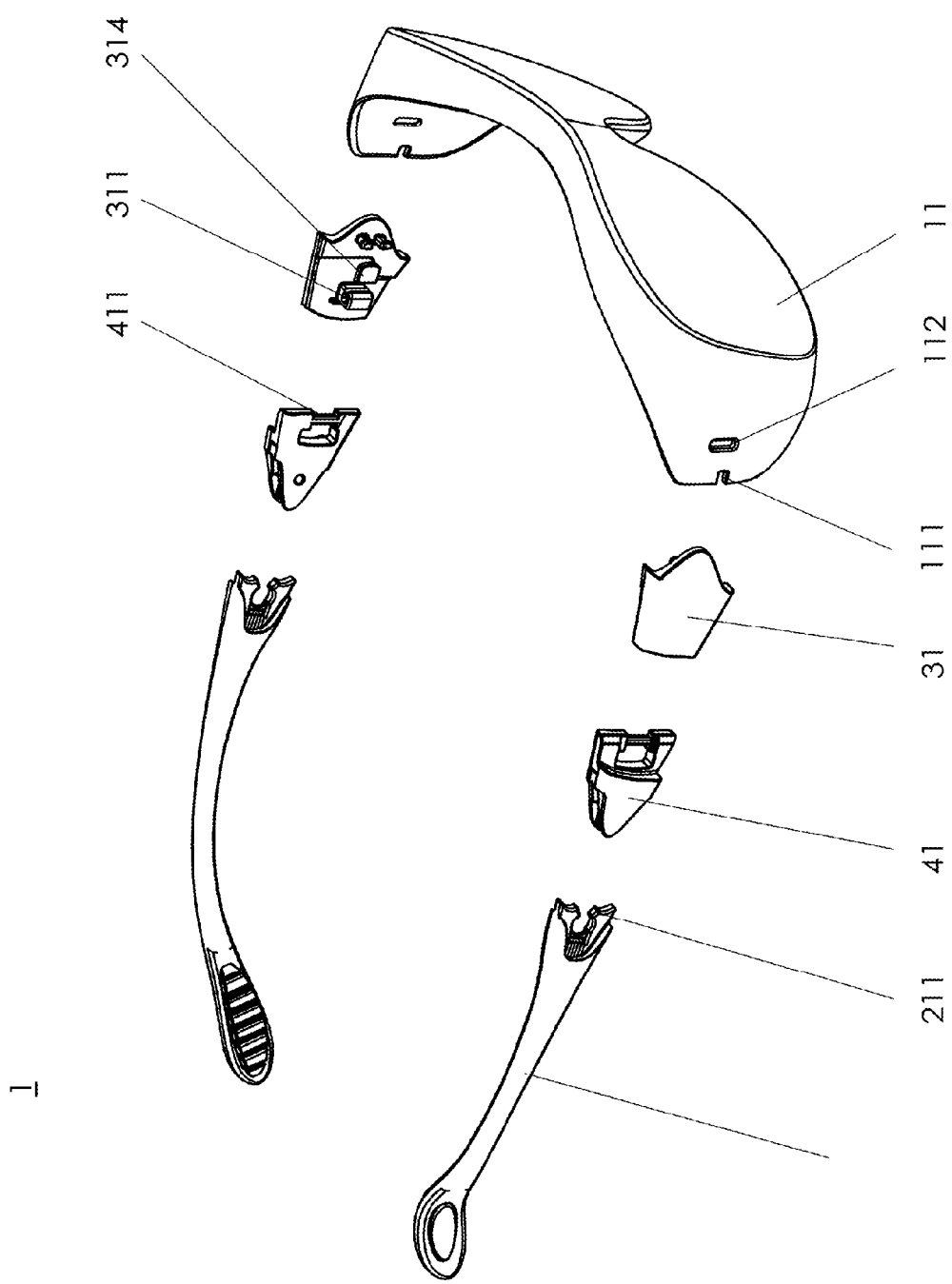
FIG. 1A to FIG. 1C are views of an embodiment of structure of eyeglasses of the present invention.
Figure 2A:
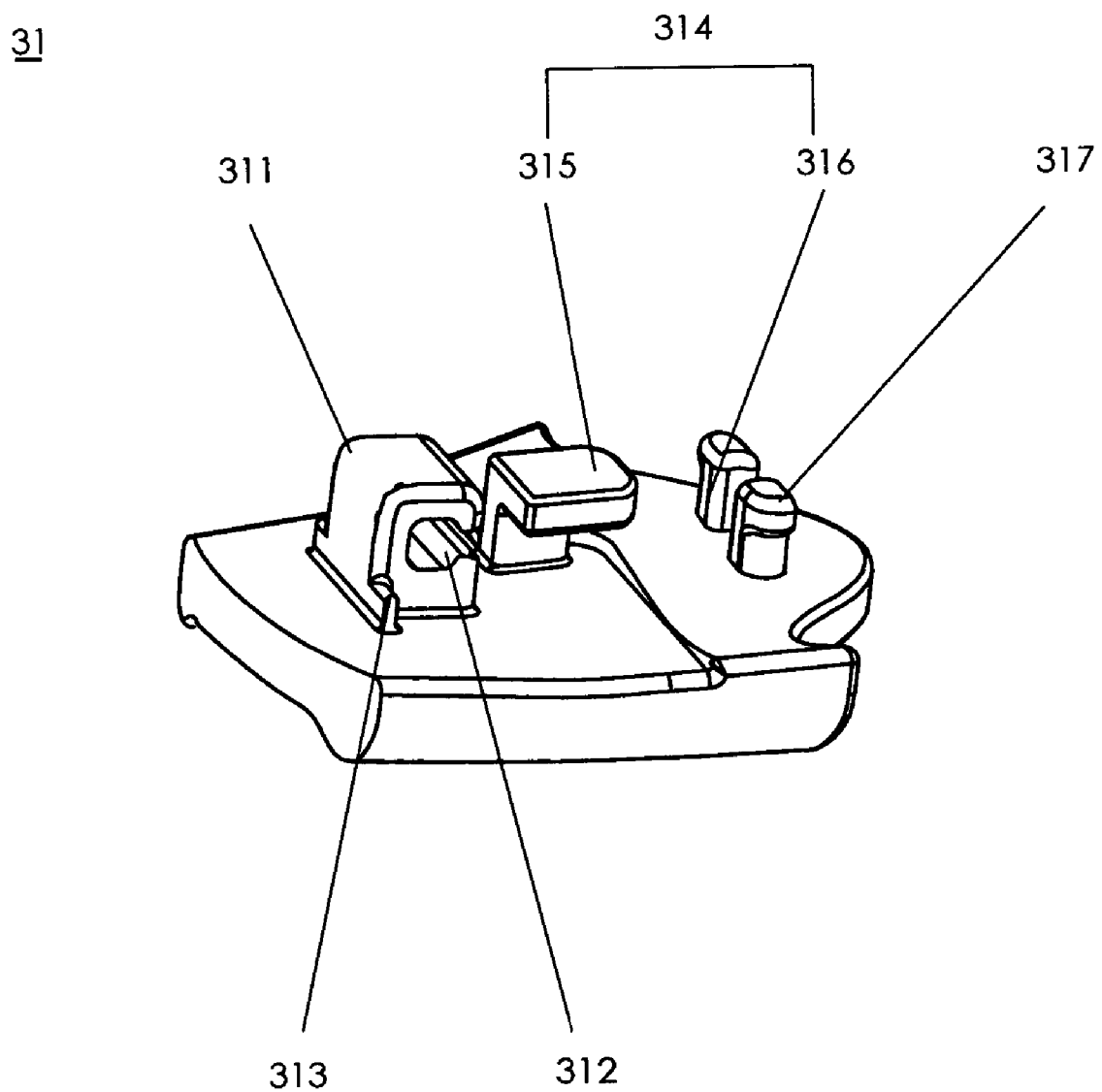
FIG. 2A and FIG. 3A are views of an embodiment of engaging element of the present invention.

FIG. 1A is a view of a preferred embodiment of the pair of eyeglasses according to the present invention. The pair of eyeglasses 1 is assembled by at least a lens 11, at least a pair of temples 21, at least a pair of engaging elements 31, and at least a connecting element 41. The lens 11 includes at least a pair of engaging elements 31 disposed on the left and right opposite sides of the lens 1, and the engaging elements 31 include a C type engaging portion 311; therefore the engaging portion 311 can be in ⌐-type or Γ-type, and the C type engaging portion 311 includes an inner surface 312. As shown in FIG. 2A, the inner surface 312 can be a polygon structure, a rounded structure, or a rugged structure, and the left and right opposite sides of the C type engaging portion 311 are further disposed with at least a pair of block walls 313. The pair of temples 21 include at least a connecting element 41 disposed at one end to be pivotally connected to the engaging elements 31 of the lens 11, and the connecting element 41 includes at least a connecting pillar 411 that is at least partially suspended, meaning that the connecting pillar 411 can be with the type of whole pillar and with two pillar ends connecting to the connecting element 41 (as shown in Figure), and can also be with the type of a pair of pillars with two pillar ends connecting to the connecting element 41 and the other two pillar ends being suspended (not shown in Figure). The connecting pillar 411 can be roughly in the shape of a square structure, a round structure, or with at least a chamfer angle for corresponding to the inner surface 312 of the C type engaging portion 311. Wherein when the connecting element 41 and the engaging elements 31 are pivotally connected to each other, the connecting pillar 411 of the connecting element 41 is disposed in the C type engaging portion 311 for the pivotal connection of the lens 11 and the temples 21 to be completed in a simple and fast way. Moreover, when the inner surface 312 of polygon structure of C type engaging portion 311 and the connecting pillar 411 of the square structure are pivotally connected to each other and turned, an interference effect can be achieved for the temples 21 to achieve the effect of locating when rotating. And the block walls 313 disposed on the left and right sides of C type engaging portion 311 can limit the adduction angle of temples 21 to prevent the temples 21 from contacting the lens 11 and thus leading to wearing down of lens 11.

FIG. 1A is a view of a preferred embodiment of pivotal connection between lens and engaging elements according to the present invention. The engaging elements 31 and the lens 11 are two individual elements. The engaging elements 31 further include at least a connection structure 314 for connecting the lens 11 and fastening the engaging elements 31 to the lens 11 via firm engagement. As shown in FIG. 2A, the connection structure 314 includes a clamp structure 315 and at least a protruding pillar 316. The clamp structure 315 is roughly in L type or T type, with one end connecting to the engaging elements 31 and the other end suspended. The protruding pillar 316 includes an extended wing portion 317, and the structure of protruding pillar 316 and the wing portion 317 are roughly in L type, T type, or Π type; wherein the protruding pillar 316 and the wing portion 317 can be integrated when being manufactured and can also be assembled by being firmly engaged with each other. Moreover, both the elements can be made of resilient material such as nylon or polymer material such as plastic, and the integrated structure of protruding pillar 316 and wing portion 317 can also be fastened to the engaging elements 31 via firm engagement.

At least a pair of slots 111 are disposed at the position on left and right opposite sides of lens 11 that correspond to the clamp structure 315 of connection structure 314 of engaging elements 31, and at least a pair of through holes 112 are further disposed at the position on left and right opposite sides of lens 11 that correspond to the protruding pillar 316 of connection structure 314 of engaging elements 31. The wing portion 317 of L type protruding pillar 316 made of resilient material is inserted into through hole 112 of lens 11 to achieve a barb interlocking effect. The suspended portion of L type or T type clamp structure 315 is firmly engaged in the slots 111 of lens 11 for providing a locating function to fasten the engaging elements 31 to the lens 11 via firm engagement.

Figure 1B:
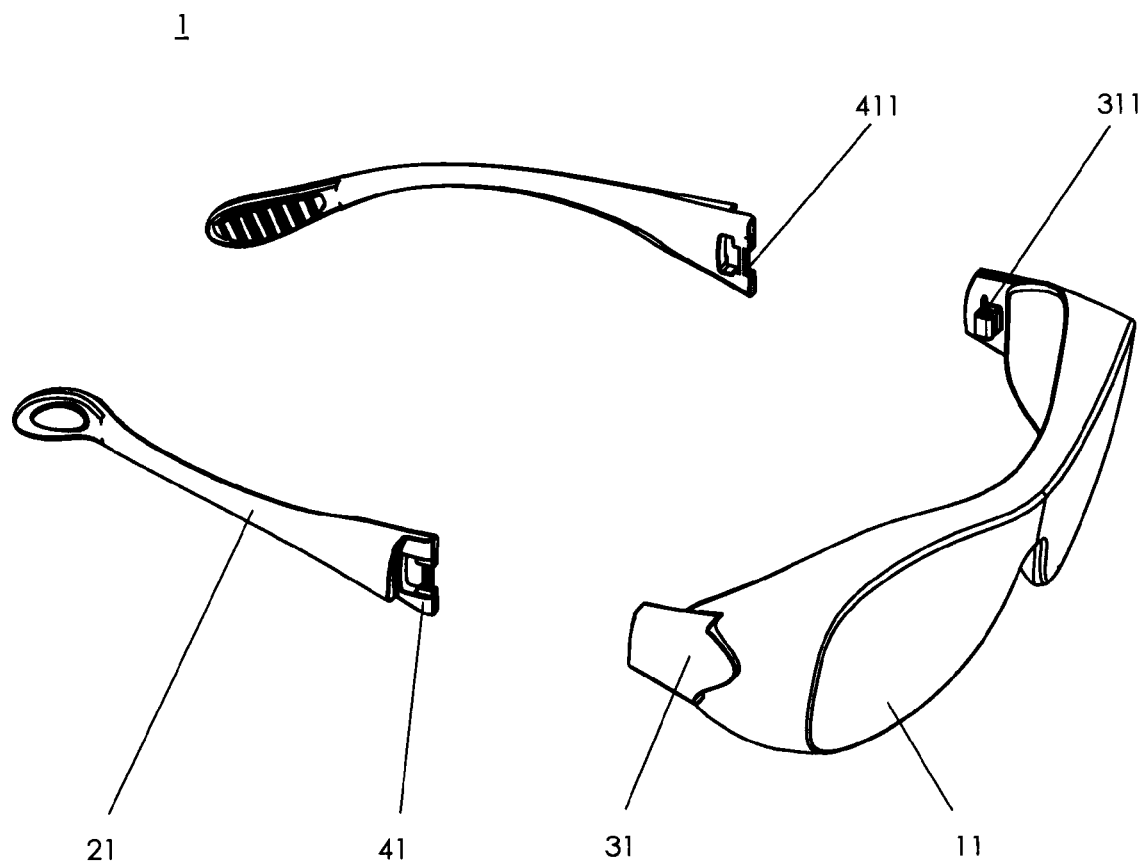

FIG. 1B is a view of another preferred embodiment of pivotal connection between lens and engaging elements according to the present invention, wherein the engaging elements 31 and the lens 11 are integrated.

Figure 2B:
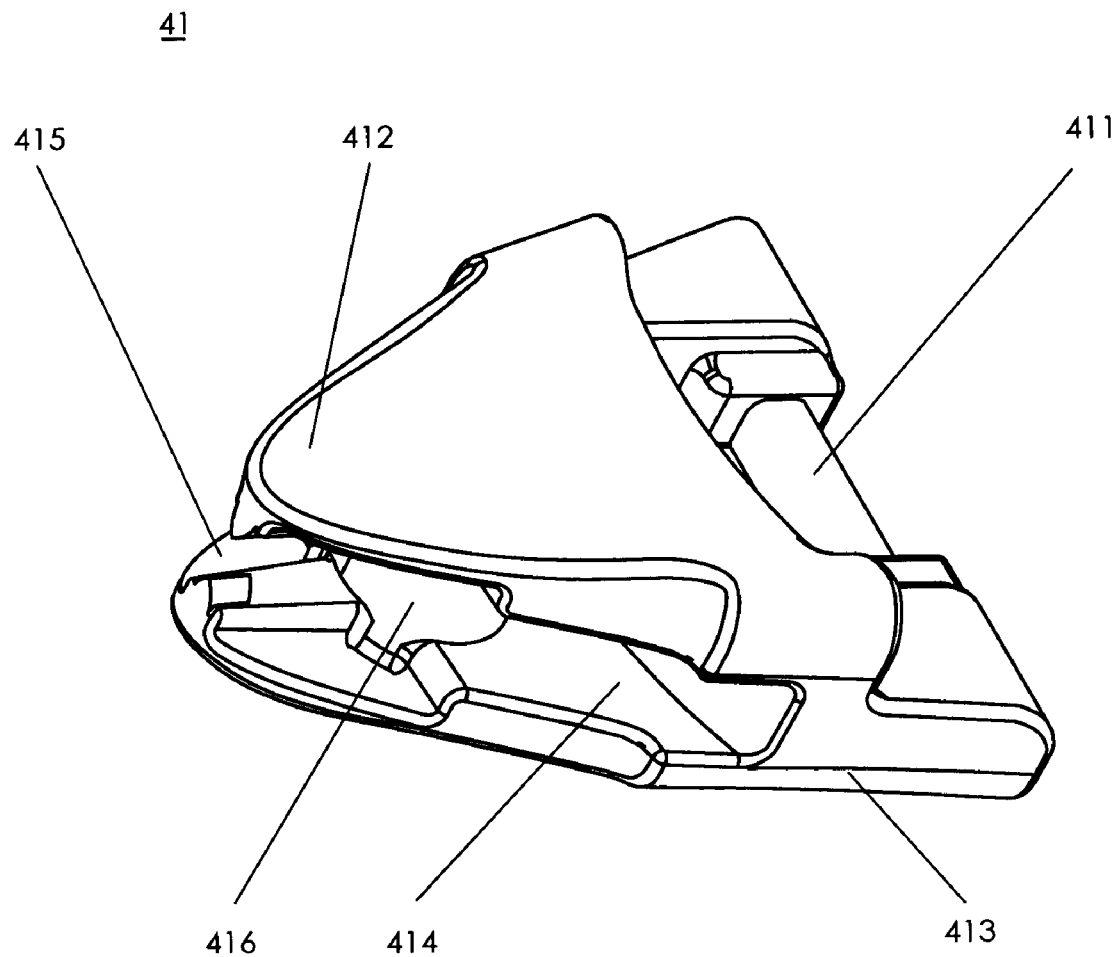
FIG. 2B and FIG. 3B are views of an embodiment of connecting element of the present invention.

FIG. 1A is a preferred embodiment of pivotal connection between temples and connecting element according to the present invention. The connecting element 41 and the temples 21 are two individual elements, and therefore the connecting element 41 is fastened to the temples 21 via firm engagement. As shown in FIG. 2B, the connecting element 41 includes an upper portion 412 and a lower portion 413, and a buckle space 414 is formed between the upper portion 412 and the lower portion 413. The buckle space 414 includes at least a buckle opening 415 and at least a buckle pillar 416 clampingly disposed in the buckle space 414.

The temples 21 include at least a buckle portion 211 disposed on one end, wherein the buckle portion 211 is roughly in a C type. The C type buckle portion 211 is inserted into the buckle opening 415 of the connecting element 41 for the C type buckle portion 211 to clamp the buckle pillar 416, and thus the connecting element 41 is fastened to the temples 21 via firm engagement.

FIG. 1B is another preferred embodiment of pivotal connection between temples and connecting element according to the present invention, wherein the connecting element 41 and the temples 21 are integrated.

Figure 1C:
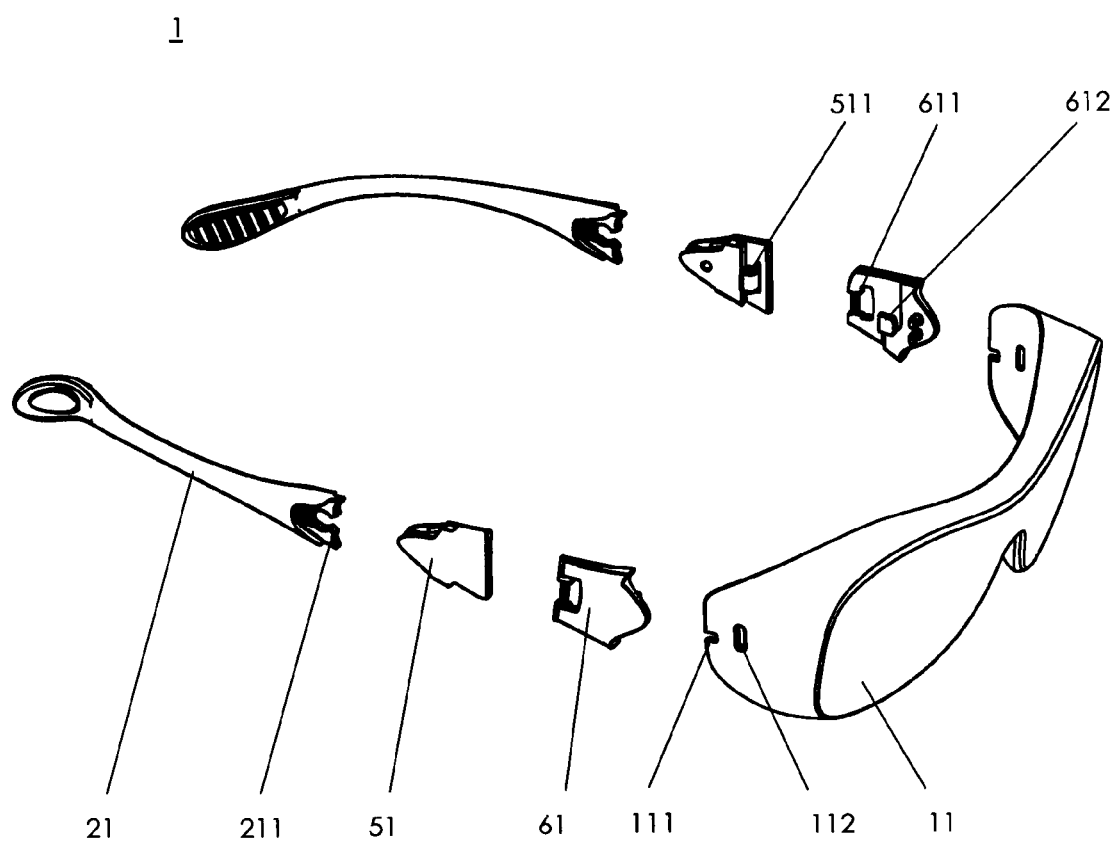
Figure 3A:
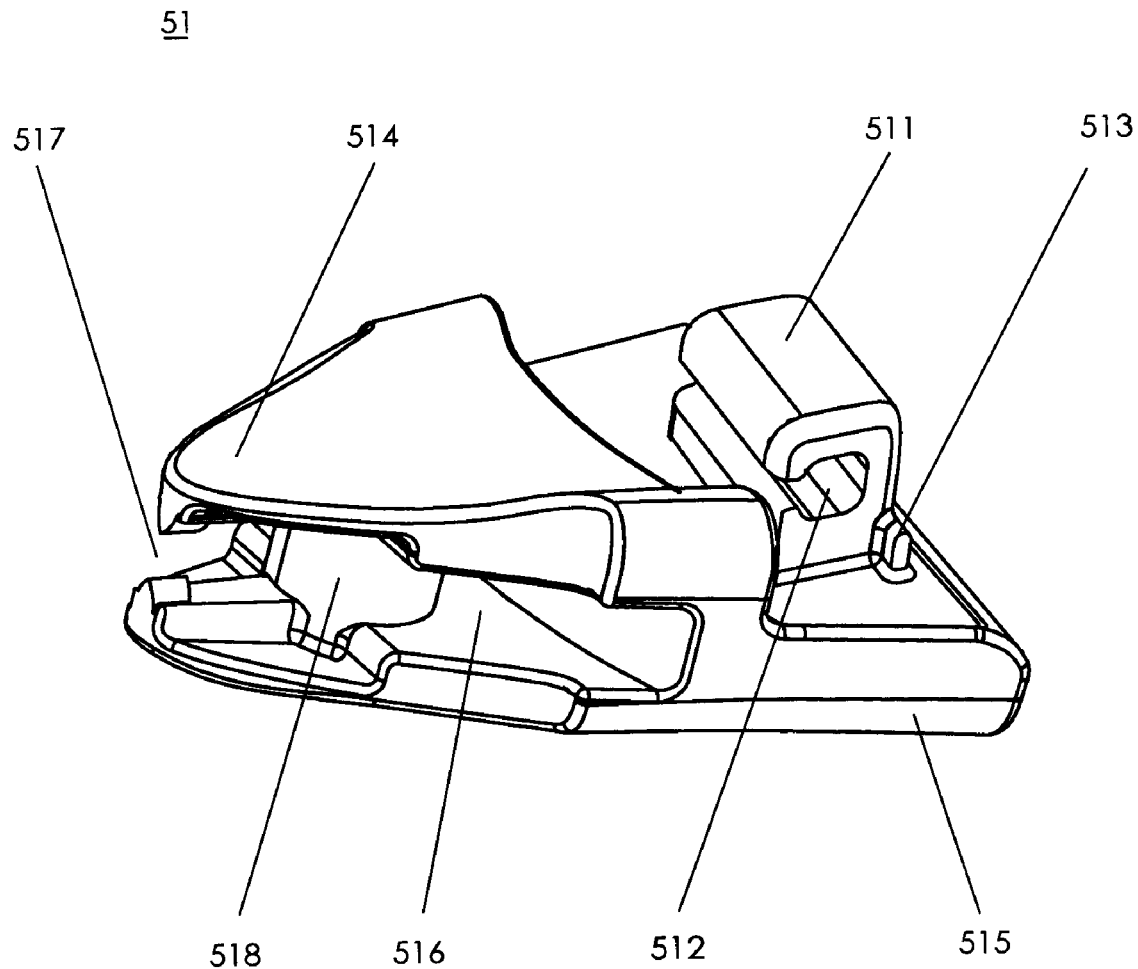

FIG. 1C is another preferred embodiment of the pair of eyeglasses according to the present invention. The pair of eyeglasses 1 is assembled by at least a lens 11, at least a pair of temples 21, at least an engaging element 51, and at least a pair of connecting elements 61. The temples 21 include at least an engaging element 51 disposed on one end and including an engaging portion 511 roughly in C type, and therefore this engaging portion 511 can also be in ⊏-type or Γ-type and the C type engaging portion 511 includes an inner surface 512. As shown in FIG. 3A, the inner surface 512 can be a polygon structure, a rounded structure, or a rugged structure, and the left and right opposite sides of the C type engaging portion 511 are further disposed with at least a pair of block walls 513. The lens 11 includes at least a pair of connecting elements 61 disposed on the left and right opposite sides of lens 11 for pivotally connecting to engaging element 51 of temples 21. The connecting elements 61 include at least a connecting pillar 611 that is at least partially suspended, meaning that the connecting pillar 611 can be with the type of whole pillar and with two pillar ends connecting to the connecting elements 61 (as shown in Figure), and can also be with the type of a pair of pillars with two pillar endw connecting to the connecting elements 61 and the other two pillar ends being suspended (not shown in Figure). The connecting pillar 611 can be roughly in the shape of a square structure, a round structure, or with at least a chamfer angle for corresponding to the inner surface 512 of the C type engaging portion 511. Wherein when the connecting elements 61 and the engaging element 51 are pivotally connected to each other, the connecting pillar 611 of the connecting elements 61 is disposed in the C type engaging portion 511 for the pivotal connection of the lens 11 and the temples 21 to be completed in a simple and fast way. Moreover, when the inner surface 512 of polygon structure of C type engaging portion 511 and the connecting pillar 611 of the square structure are pivotally connected to each other and turned, an interference effect can be achieved for the temples 21 to achieve the effect of locating when rotating. And the block walls 513 disposed on the left and right sides of C type engaging portion 511 can limit the adduction angle of temples 21 to prevent the temples 21 from contacting the lens 11 and thus leading to wearing down of lens 11.

FIG. 1C is a preferred embodiment of pivotal connection between temples and engaging element according to the present invention. The engaging element 51 and the temples 21 are two individual elements, and therefore the engaging element 51 is fastened to the temples 21 via firm engagement. As shown in FIG. 3A, the engaging element 51 includes an upper portion 514 and a lower portion 515, and a buckle space 516 is formed between the upper portion 514 and the lower portion 515. The buckle space 516 includes at least a buckle opening 517 and at least a buckle pillar 518 clampingly disposed in the buckle space 516.

The temples 21 include at least a buckle portion 211 disposed on one end, wherein the buckle portion 211 is roughly in a C type. The C type buckle portion 211 is inserted into the buckle opening 517 of the engaging element 51 for the C type buckle portion 211 to clamp the buckle pillar 518, and thus the engaging element 51 is fastened to the temples 21 via firm engagement.

The present invention provides another preferred embodiment of pivotal connection between temples and engaging element, wherein the engaging element and the temples are integrated.

Figure 3B:
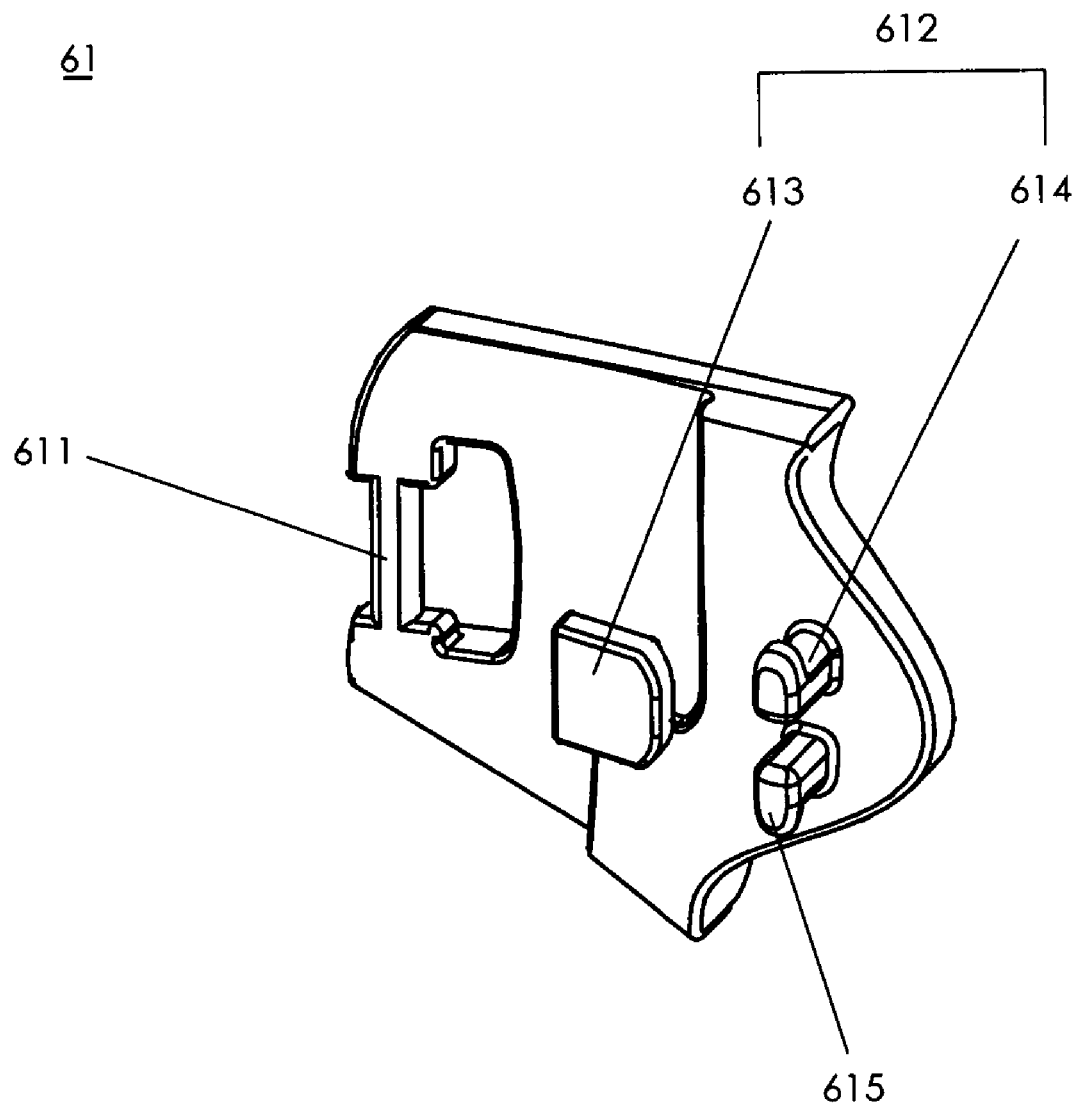

FIG. 1C is a preferred embodiment of pivotal connection between lens and connecting element according to the present invention. The connecting element 61 and the lens 11 are two individual elements, and the connecting element 61 further includes at least a connection structure 612 for connecting the lens 11 to fasten the connecting element 61 to the lens 11 via firm engagement. As shown in FIG. 3B, the connection structure 612 includes a clamp structure 613 and at least a protruding pillar 614. The clamp structure 613 is roughly in L type or T type, with one end connecting to the connecting element 61 and the other end being suspended. The protruding pillar 614 includes an extended wing portion 615, and the structure of the protruding pillar 614 and the wing portion 615 is roughly in L type, T type, or Π type, wherein the protruding pillar 614 and the wing portion 615 can be integrated when being manufactured and can also be assembled by being firmly engaged with each other. Moreover, both the elements can be made of resilient material such as nylon or polymer material such as plastic, and the integrated structure of protruding pillar 614 and wing portion 615 can also be fastened to the connecting element 61 via firm engagement.

At least a pair of slots 111 are disposed at the position on left and right opposite sides of lens 11 that correspond to the clamp structure 613 of connection structure 614 of connecting element 61, and at least a pair of through holes 112 are further disposed at the position on left and right opposite sides of lens 11 that correspond to the protruding pillar 614 of connection structure 612 of connecting element 61. The wing portion 615 of L type protruding pillar 614 made of resilient material is inserted into through hole 112 of lens 11 to achieve a barb interlocking effect. The suspended portion of L type or T type clamp structure 613 is firmly engaged in the slots 111 of lens 11 for providing a locating function to fasten the connecting elements 61 to the lens 11 via firm engagement.

The present invention provides another preferred embodiment of pivotal connection between lens and connecting elements, wherein the connecting elements and the lens are integrated.

Figure 4A:
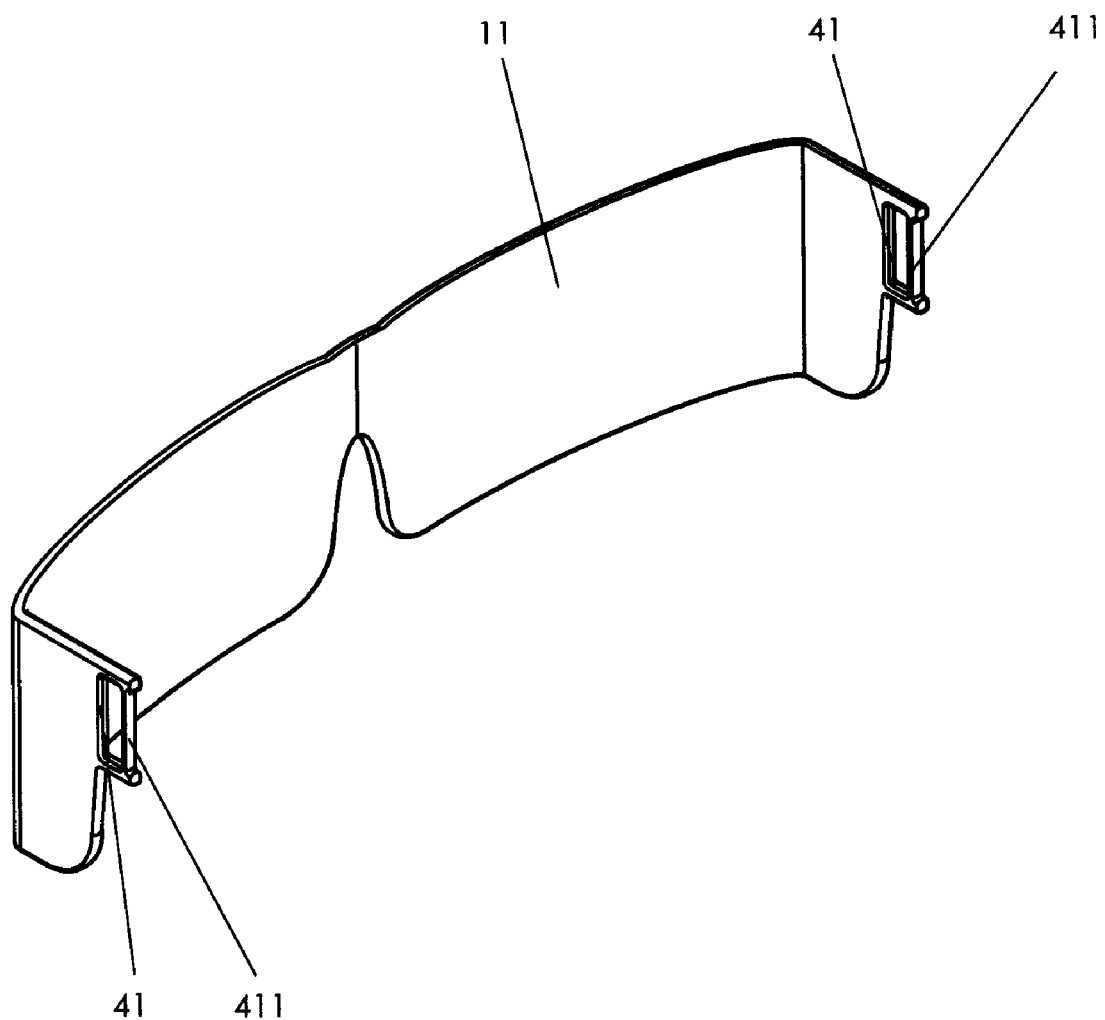
FIG. 4A to FIG. 4C are views of an embodiment of structure of eyeglasses of the present invention.
Figure 4B:
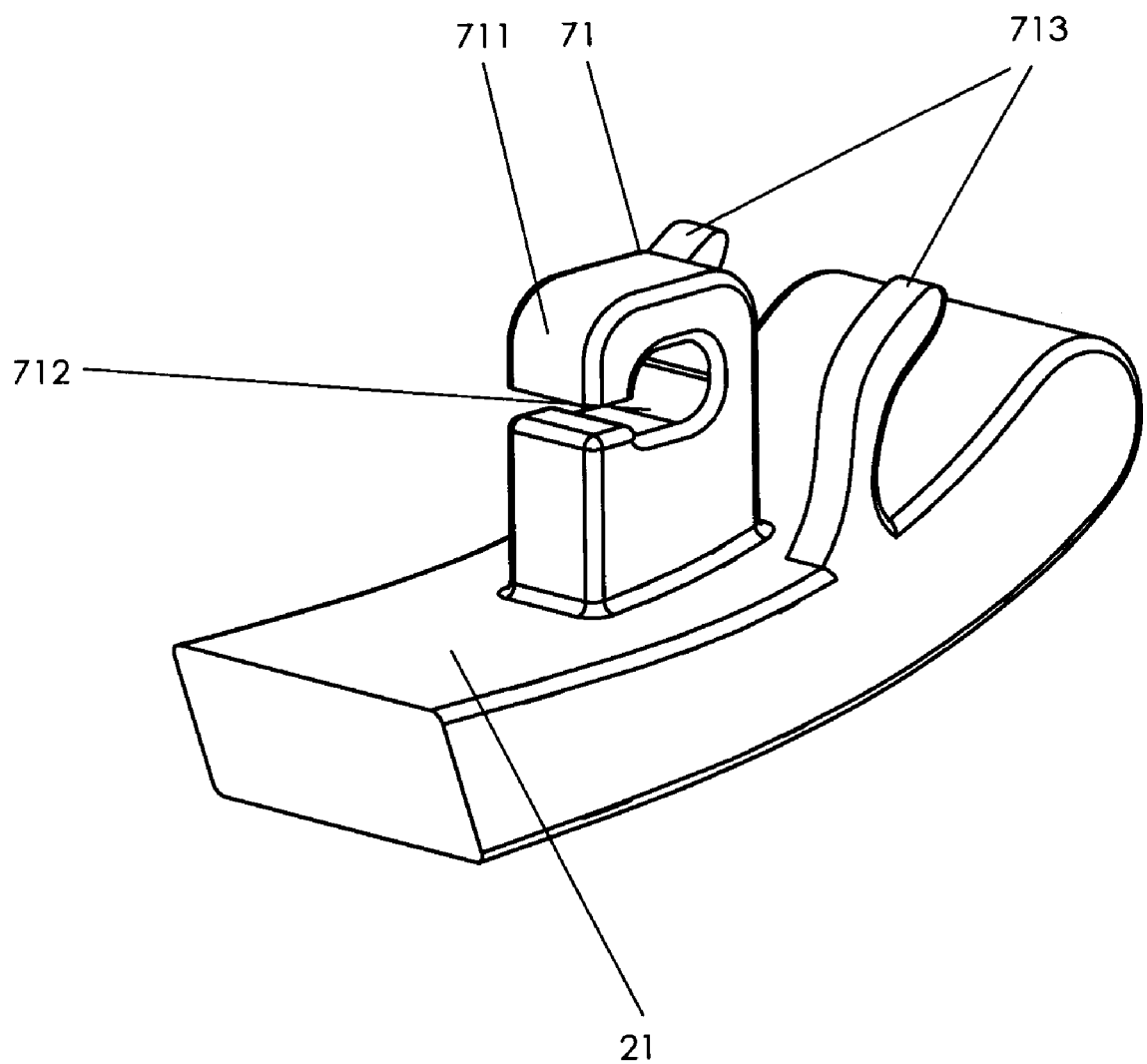

FIG. 4A and FIG. 4B are views of still another preferred embodiment of the pair of eyeglasses according to the present invention. The pair of eyeglasses 1 is assembled by at least a lens 11, at least a pair of temples 21, at least an engaging element 71, and at least a pair of connecting elements 41. The temples 21 include at least an engaging element 71 disposed on one end and including an engaging portion 711 roughly in C type, and therefore this engaging portion 711 can also be in ⊏-type or Γ-type and the C type engaging portion 711 includes an inner surface 712. The inner surface 712 can be a polygon structure, a rounded structure, or a rugged structure, and the left and right opposite sides or the upper and the lower sides of the C type engaging portion 711 further include at least a pair of withstanding portions 713. The lens 11 includes at least a pair of connecting elements 41 disposed on the left and right opposite sides of lens 11 for pivotally connecting to engaging element 71 of temples 21. The connecting elements 41 include at least a connecting pillar 411 and is at least partially suspended, meaning that the connecting pillar 411 can be with the type of whole pillar and with two pillar ends connecting to the connecting elements 41 (as shown in Figure), and can also be with the type of a pair of pillars with two pillar ends connecting to the connecting elements 41 and the other two pillar ends being suspended (not shown in Figure). The connecting pillar 411 can be roughly in the shape of a square structure, a round structure, or with at least a chamfer angle for corresponding to the inner surface 712 of the C type engaging portion 711. Wherein when the connecting elements 41 and the engaging element 71 are pivotally connected to each other, the connecting pillar 411 of the connecting elements 41 is disposed in the C type engaging portion 711 for the pivotal connection of the lens 11 and the temples 21 to be completed in a simple and fast way. Moreover, when the inner surface 712 of polygon structure of C type engaging portion 711 and the connecting pillar 411 of the square structure are pivotally connected to each other and turned, a interference effect can be formed for the temples 21 to achieve the effect of locating when rotating. And the withstanding portions 713 disposed on the left and right opposite sides or the upper and the lower sides of C type engaging portion 711 can pass through the suspended part of the connecting pillar 411 to achieve an interference effect with the lens 11 for the temples 21 to have the function of interlocking and locating when being located on the lens 11.

Figure 4C:
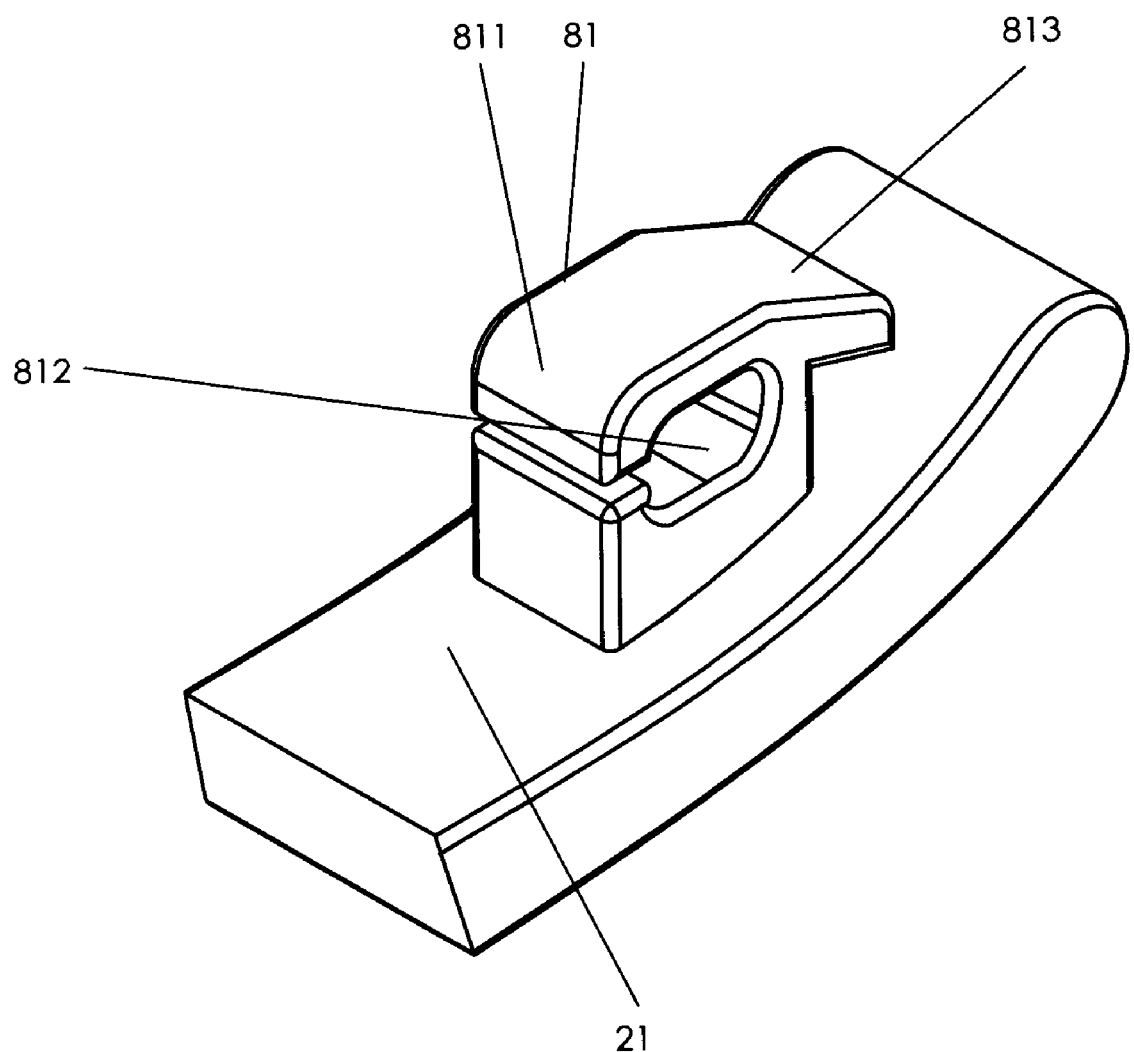

FIG. 4A and FIG. 4C are views of yet another preferred embodiment of the pair of eyeglasses according to the present invention. The pair of eyeglasses is assembled by at least a lens 11, at least a pair of temples 21, at least an engaging element 81, and at least a pair of connecting elements 41. The temples 21 include at least an engaging element 81 disposed on one end and including an engaging portion 811 roughly in C type, and therefore this engaging portion 811 can also be in ⊏-type or Γ-type and the C type engaging portion 811 includes an inner surface 812. The inner surface 812 can be a polygon structure, a rounded structure, or a rugged structure. The C type engaging portion 811 includes a top supporting piece 813 disposed on its top, wherein the top supporting piece 813 can include surface with multiple curvatures or different slopes. The lens 11 includes at least a pair of connecting elements 41 disposed on the left and right opposite sides of lens 11 for pivotally connecting to engaging element 81 of temples 21. The connecting elements 41 include at least a connecting pillar 411 and is at least partially suspended, meaning that the connecting pillar 411 can be with the type of whole pillar and with two pillar ends connecting to the connecting elements 41 (as shown in Figure), and can also be with the type of a pair of pillars with two pillar ends connecting to the connecting elements 41 and the other two pillar ends being suspended (not shown in Figure). The connecting pillar 411 can be roughly in the shape of a square structure, a round structure, or with at least a chamfer angle for corresponding to the inner surface 812 of the C type engaging portion 811. Wherein when the connecting elements 41 and the engaging elements 81 are pivotally connected to each other, the connecting pillar 411 of the connecting elements 41 is disposed in the C type engaging portion 811 for the pivotal connection of the lens 11 and the temples 21 to be completed in a simple and fast way. Moreover, when the inner surface 812 of polygon structure of C type engaging portion 811 and the connecting pillar 411 of the square structure are pivotally connected to each other and turned, a interference effect can be formed for the temples 21 to achieve the effect of locating when rotating. And since the top supporting piece 813 disposed on the C type engaging portion 811 includes surface with multiple curvatures or different slopes, therefore when the temples 21 adduct, there will be interference effect of different degrees generated between the surface of top supporting piece 813 and the connecting elements 41 as the adduction angle of temples 21 changes for the temples 21 to have the function of interlocking and locating when being located on the lens 11.

The pair of eyeglasses of the present invention is assembled in a simpler way by using engaging element and connecting element for completing the pivotal connection of lens and temples, and therefore time and manpower cost spent in completing pivotal connection and disassembly can be greatly saved. Moreover, because the pair of eyeglasses is assembled by several components, if one of the components cracks or is worn out and leads to damage, only the damaged component needs to be replaced individually and no unnecessary waste will be generated.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A pair of eyeglasses, comprising:
   at least a lens, said lens including at least a pair of engaging elements disposed on left and right opposite sides of said lens, said engaging elements including an engaging portion having an approximate C-shape contour portion; and
   at least a pair of temples, each of said temples including at least a connecting element fixedly coupled on one end of each of said temples and pivotally connected to said engaging elements of said lens on an opposing end, each of said connecting elements including at least a connecting pillar being at least partially suspended from a body of each of said connecting elements;
   wherein when each of said connecting elements and said engaging elements are pivotally connected to each other, said connecting pillar of each of said connecting elements is disposed in said engaging C-shape contour portion of each of said engaging portion.

2. The pair of eyeglasses according to claim 1, wherein said C type engaging portion includes an inner surface, and structure of said inner surface is selected from the group consisting of: a polygon structure, a rounded structure, and a rugged structure.

3. The pair of eyeglasses according to claim 1, wherein said engaging elements and said lens are two individual elements, said engaging elements further including at least a connection structure for connecting to said lens.

4. The pair of eyeglasses according to claim 3, wherein said connection structure of said engaging elements includes a clamp structure.

5. The pair of eyeglasses according to claim 4, wherein one end of said clamp structure connects to said engaging element and the other end is suspended.

6. The pair of eyeglasses according to claim 4, wherein said connection structure of said engaging elements further includes a protruding pillar disposed on said engaging elements.

7. The pair of eyeglasses according to claim 6, wherein said protruding pillar includes an extended wing portion.

8. The pair of eyeglasses according to claim 6, further including at least a pair of through holes disposed at position on left and right opposite sides of said lens that correspond to said protruding pillar of said connection structure of said engaging elements.

9. The pair of eyeglasses according to claim 4, further including a pair of slots disposed at position on left and right opposite sides of said lens that correspond to said clamp structure of said connection structure of said engaging elements.

10. The pair of eyeglasses according to claim 1, wherein said structure of said connecting pillar of said connecting element is selected from the group consisting of: a square structure, a round structure, and structure with at least a chamfer angle.

11. The pair of eyeglasses according to claim 1, wherein said connecting element includes an upper portion and a lower portion, and a buckle space is formed between said upper portion and said lower portion.

12. The pair of eyeglasses according to claim 11, wherein said buckle space includes at least a buckle opening.

13. The pair of eyeglasses according to claim 11, further including at least a buckle pillar clampingly disposed in said buckle space.

14. The pair of eyeglasses according to claim 1, wherein said temples include at least a buckle portion disposed on one end of said temples.

15. The pair of eyeglasses according to claim 14, wherein said buckle portion is roughly in a C type.

16. A pair of eyeglasses, comprising:
   at least a pair of temples, each of said temples including at least an engaging element fixedly coupled on one end of each of said temples, said engaging element including an engaging portion having an approximate C-shape contour portion; and
   at least a lens, each of said lens including at least a pair of connecting elements fixedly coupled on left and right opposite sides of each of said lens and pivotally connected to said engaging element of said temples, each of said connecting elements including at least a connecting pillar, said connecting pillar being at least partially suspended from a body of each of said connecting elements;
   wherein when each of said connecting elements and said engaging element are pivotally connected to each other, said connecting pillar of each of said connecting elements is disposed in said C-shape contour portion of said engaging portion.

17. The pair of eyeglasses according to claim 16, further including at least a pair of withstanding portions disposed on left and right opposite sides of said C type engaging portion.

18. The pair of eyeglasses according to claim 17, wherein said C type engaging portion includes a top supporting piece disposed on its top.

19. The pair of eyeglasses according to claim 18, wherein said top supporting piece includes a surface with multiple curvatures.

20. The pair of eyeglasses according to claim 18, wherein said top supporting piece includes a surface with different slopes.

* * * * *